(12) United States Patent
Shriver

(10) Patent No.: US 6,289,956 B1
(45) Date of Patent: Sep. 18, 2001

(54) WOOD PLANER ATTACHMENT FOR DIRECTING AND CAPTURING WOOD SHAVINGS AND CHIPS

(76) Inventor: Earl Shriver, 502 Barclay, Dewey, OK (US) 74029

( * ) Notice: Subject to any disclaimer, the term of this patent is extended or adjusted under 35 U.S.C. 154(b) by 0 days.

(21) Appl. No.: 09/621,231

(22) Filed: Jul. 21, 2000

(51) Int. Cl.[7] ................................................. B27G 21/00
(52) U.S. Cl. .............. 144/252.1; 83/100; 144/114.1; 144/117.1; 409/137
(58) Field of Search .................... 15/35, 337; 30/475; 83/100; 144/114.1, 117.1, 252.1, 252.2; 451/456

(56) References Cited

U.S. PATENT DOCUMENTS

| | | | |
|---|---|---|---|
| 3,913,642 | 10/1975 | Porter | 144/114.1 |
| 4,201,256 | * 5/1980 | Truhan | 144/252.1 |
| 4,440,204 | 4/1984 | Bartlett | 144/130 |
| 4,485,859 | 12/1984 | Krogstad et al. | 144/252.1 |
| 4,601,104 | * 7/1986 | Zaiser, et al. | 30/475 |
| 4,822,219 | * 4/1989 | Wood, et al | 144/252.1 X |
| 5,237,896 | * 8/1993 | Albright, et al. | 83/100 X |
| 5,463,816 | 11/1995 | Bellew et al. | 30/415 |
| 5,914,766 | 8/1999 | Iversen | 451/456 |
| 5,993,124 | * 11/1999 | Cooper, et al. | 409/137 |
| 6,148,879 | * 11/2000 | Liao | 144/117.1 |

* cited by examiner

*Primary Examiner*—W. Donald Bray
(74) *Attorney, Agent, or Firm*—Head, Johnson & Kachigian

(57) ABSTRACT

An improved chip capturing device for a planer comprising a chip director hood attached to a wood planer housing and a tubular shaped chip transporter. A first aperture of generally oval shape is embodied within the chip transporter and positioned on a first end of the transporter while a second aperture of generally oval shape and of greater circumference than the first aperture is embodied and positioned on a second end of the transporter. A third aperture to facilitate the introduction of wood shavings and chips to the tubular shaped chip transporter is positioned generally between the first and second apertures, reflects a generally rectangular shape, and extends downwardly generally perpendicular to the chip capture hood.

13 Claims, 5 Drawing Sheets

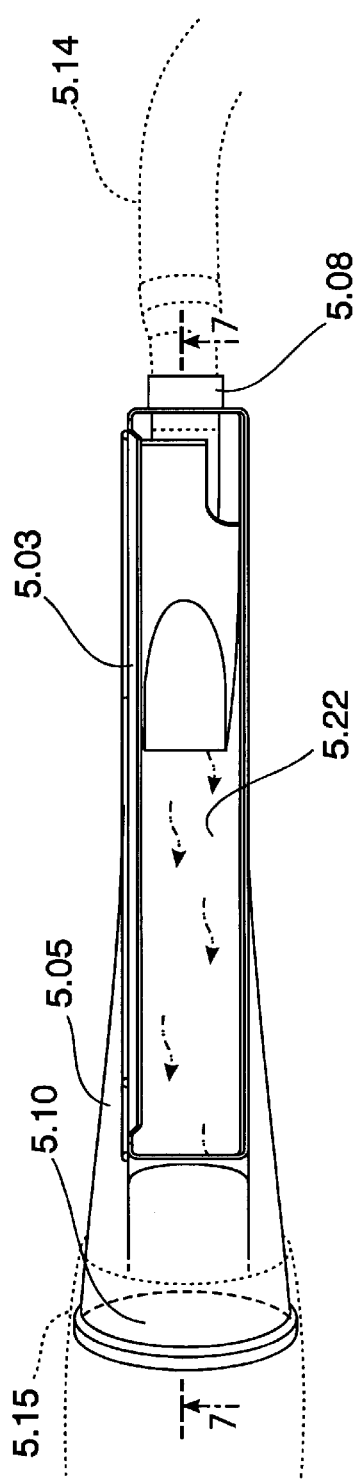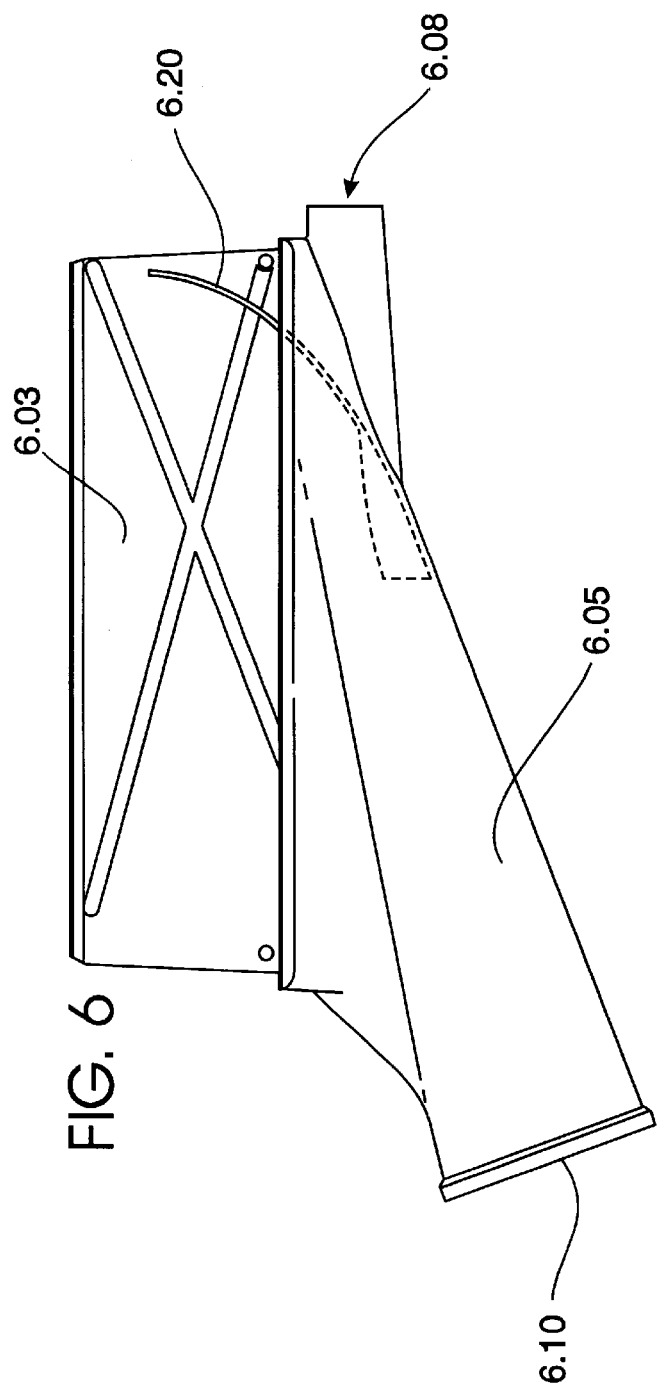

WOOD PLANER ATTACHMENT FOR DIRECTING AND CAPTURING WOOD SHAVINGS AND CHIPS

REFERENCE TO PENDING APPLICATIONS

This application is not related to any pending applications.

REFERENCE TO MICROFICHE APPENDIX

This application is not referenced in any microfiche appendix.

TECHNICAL FIELD OF THE INVENTION

The present invention relates generally to attachments for motor driven wood planers. In particular, the present invention relates to an improved wood planer attachment for directing and capturing wood shavings and chips, utilizing airflow exhaust from the planer drive motor plus airflow from the cutter blades plus additional airflow from the sweeper exhaust.

BACKGROUND OF THE INVENTION

Wood planers and devices for improving upon the operational efficiency of such planers are well represented in the prior art. For example:

U.S. Pat. No. 3,913,642 issued on Oct. 21, 1975 to Donald C. Porter discloses a Wood Cutting Apparatus. An apparatus for cutting patterns on a wooden surface to stimulate a hand-hewn surface such as might have been made with an adz. The apparatus provides for feeding, aligning and holding an elongated piece of wood for cutting a pattern on the surface and a blower-suction arrangement for removing sawdust and wood chips. A plurality of rotatable cutting blades are mounted in a rotatable casing. Each rotatable cutting blades are mounted to cut the surface of the wood while the rotatable blade is being rotated in the rotating casing to produce a random pattern on the surface of the wood.

U.S. Pat. No. 4,440,204 issued on Apr. 3, 1984 to Robert L. Bartlett, subsequently assigned to Shopsmith, Inc., discloses a Planter Mounting System wherein a planer of the type adapted to be mounted on and driven by a multipurpose woodworking tool includes a housing, a rotating blade member, and a table mounted beneath the blade member and vertically displaceable relative thereto by a plurality of jack screws. The jack screws carry connector nuts having outer members attached to the table which allow relative sideward movement between the table and screws to minimize table binding. A chain drive engages the jack screws and includes an idler sprocket which can be adjusted to allow adjustment of an individual jack screw to level the table. First and second roller assemblies upstream and downstream of the blade member are rotatably mounted on the housing and are vertically displaceable; the roller assemblies are driven by a single, fixed drive sprocket which is capable of rotating the rollers throughout a range of vertical displacement. A chip removal hood is mounted on the housing and has an exhaust nozzle adapted to receive a hose of a vacuum cleaner to draw chips through the hood. A pair of clamping members are attached to side walls so that the blade member and an output shaft of a head stock of the woodworking tool are coaxial, whereby a coupling member may be used to transmit rotary power there between. A switching device includes a master switch that controls the flow of electric current to both the head stock and the electric motor driving the feed mechanism, and includes a key-operated locking mechanism.

U.S. Pat. No. 4,485,859 issued on Dec. 4, 1984 to James Krogstad et al, subsequently assigned to Shopsmith, Inc., discloses aPlaner Chip Removal System wherein a planer is adapted to be mounted on a multipurpose woodworking tool which includes a housing, a rotating blade driven by the head stock of the tool, and a vertically displaceable table mounted beneath the blade. The table is supported by a plurality of jack screws mounted on the housing and attached to the table by connector nuts which eliminate binding as the table is raised or lowered. The jack screws are driven by a chain drive having an adjustable idler sprocket which permits the chain to be disengaged from a selected jack screw to allow it to be rotated to level the table. Vertically displaceable feed roller assemblies are attached to the housing and each includes a sprocket meshing with a common drive sprocket with sufficient, engagement to be driven throughout the vertical displacement of the rollers. A chip removal hood is mounted on the housing and has an exhaust nozzle adapted to receive a vacuum cleaner hose. The planer is releasably mounted to the woodworking tool by a pair of clamps. A switching device includes a master switch controlling the power to both the head stock and an electric motor driving the drive sprocket; a key-operated mechanism locks the switch in an open position.

U.S. Pat. No. 5,463,816 issued on Nov. 7, 1995 to William S. Bellew et al., subsequently assigned to Ryobi North American, discloses a Portable Planer With Adjustable Chip Deflector wherein a portable planer for use by a user to cut chips or material from a workpiece is disclosed. The portable planer includes a chip deflector moveably attached to a housing of the portable planer. The nozzle can be oriented with respect to the housing such that chips expelled from the portable planer are directed away from the user and downwardly toward a floor.

Alternatively, the chip deflector can be reoriented with respect to the housing so that a collector bag or vacuum hose can be attached to the nozzle whereby chips are collected in an enclosed container rather than being freely blown. Ideally, the nozzle is swivelably attached to the housing to permit the selected positioning of the nozzle relative to the housing.

U.S. Pat. No. 5,941,766 issued on Aug. 24, 1999 to Edward P. Iverson discloses a Dust Collector. A fixed torpedo mounted in the center of a funnel assembly for a dust collector removes residue caused by a machining practice applied to a work piece, with enhanced flow characteristics due to the fixed torpedo of a dual cone shape fixedly secured in the funnel.

As can be seen from the afore cited prior art, such art is absent disclosure and design for introducing a forced air stream into a chip capturing device to facilitate enhanced transport and removal of debris associated with normal wood planer operations. Such debris would include, without limitation, wood chips and shavings. The present invention addresses this deficiency by introducing a forced air stream to its improved chip capturing device and further allows for the introduction of debris to and through a tubular shaped chip transport with transported debris finally disposed in a containment vessel suitable for recycling or disposal purposes.

BRIEF SUMMARY OF THE INVENTION

An apparatus to provide for enhanced efficiency in the transportation and disposal of exiting wood shavings and/or chips from a wood planer. The instant invention facilitates the introduction of a forced air stream to supplement motor fan exhaust into a tubular shaped chip transporting device creating a forced air means to transport and dispose of wood shavings and chips exiting the planer. The forced air stream introduced to the instant invention is induced by an external blower, such as can be found in, without limitation, shop vacuums. Tubular air transport vessels such as, but not limited to, flexible or rigid pipe/tube housing allow for the attachment of an air force blowing means and chip containment vessel. From the containment vessel, an additional hose can be connected to an outside wall vent to expel the wood dust generated by some types of hardwood.

Consequently, it is an object of the instant invention to serve as an improved attachment for directing and capturing wood shavings and chips exiting from a wood planer utilizing air flow from the planer drive motor fan and the turbine effect of the rotating cutter blades.

It is a further object of the instant invention to introduce a forced air stream to a tubular shaped chip transporting device to facilitate the transport of wood chips/shavings exiting a wood planer.

It is yet a further object of the instant invention to provide an exiting means for such wood chips/shavings which allows for ease in recycling or disposing of such chips/shavings.

It is another object of the instant invention to provide ease of attachment when securing said improved wood planer attachment to a wood planer.

It is yet a further object of the instant invention to allow for the creation of a venturi effect to further enhance transport of exiting wood chips/shavings.

Other objects and further scope of the applicability of the present invention will become apparent from the detailed description to follow, taken in conjunction with the accompanying drawings wherein like parts are designated by like reference numerals.

DESCRIPTION OF THE DRAWINGS

FIG. 5 illustrates a second side perspective view of the invention's preferred embodiment, further detailing internal structure of the invention's tubular shaped chip transporter.

FIG. 6 illustrates a bottom side perspective view of the invention's preferred embodiment.

DETAILED DESCRIPTION OF THE PREFERRED EMBODIMENT

While the making and using of various embodiments of the present invention are discussed in detail below, it should be appreciated that the present invention provides for inventive concepts capable of being embodied in a variety of specific contexts. The specific embodiments discussed herein are merely illustrative of specific manners in which to make and use the invention and are not to be interpreted as limiting the scope of the instant invention.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is clear that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

Figure 1:
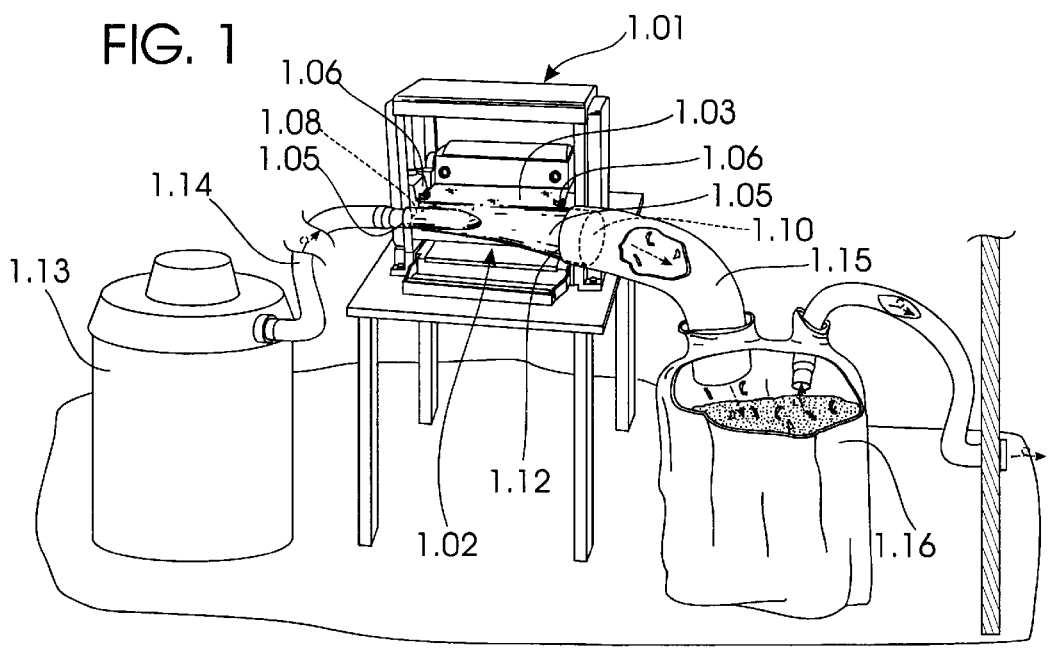
FIG. 1 illustrates the invention as practiced in its preferred embodiment affixed to a wood planer.

FIG. 1 illustrates the invention as practiced in its preferred embodiment affixed to a wood planer 1.01. In FIG. 1, a wood planer 1.01 is shown with the improved chip capturing device of the present invention 1.02 attached thereto. It will be understood that while one type of wood planer is illustrated, the present invention may be employed with wood planers of various designs. Also shown in FIG. 1 is the chip deflector hood 1.03 of the instant invention shown attached to the external housing of the wood planer 1.01. Such attachment is facilitated via attachment means 1.06 well known to those skilled in the art but without limitation including wing nuts, eye screws, bolts, and various other attachment means. In the preferred embodiment of the instant invention, attachment apertures located within the chip deflecting hood 1.03 allows for a threaded attachment means to be inserted through such apertures, with applicable attachment structures such as wing nuts utilized to complete attachment of the instant invention 1.02 to the wood planer 1.01. FIG. 1 also illustrates a tubular shape chip transporter 1.05 attached to a chip deflector hood 1.03. A first aperture 1.08 of generally oval shape is embodied within the chip transporter 1.05 and is located on a first end of said transporter 1.05. A second aperture, also of generally oval shape 1.10, is embodied within said transporter 1.05, is of greater circumference than first aperture 1.08, and is positioned on a second end 1.12 of said transporter 1.05 generally opposite of said first aperture 1.08. A third aperture (not shown) of generally rectangular shape extends downward generally perpendicular to the chip deflector hood 1.03 with location of said aperture generally positioned between said first 1.08 and second apertures 1.10. Further discussion and illustrative detail with respect to said third aperture will be discussed in association with FIGS. 3, 4 and 5.

Figure 2:
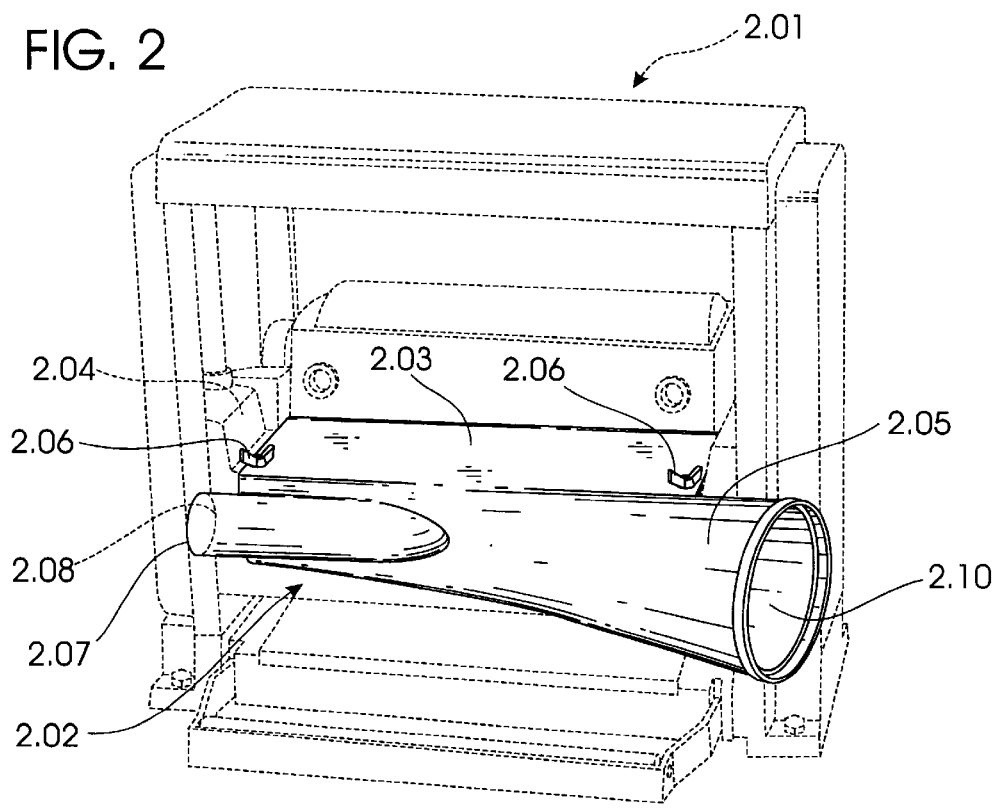
FIG. 2 is an illustration of a phantomed planer providing closer detail of the present invention attached thereto.

Continuing with discussion of FIG. 1, when a chip planer 1.01 is utilized, wood chips and shavings are expelled from the planer 1.01 by the force of the planer cutter blades plus the cooling air from the planer drive motor. The present invention provides that the expulsion of such debris is funneled into a tubular shaped transporter 1.05 where such debris is joined with an additional forced air stream introduced via an air force induction means 1.13 such as but not limited to a shop vacuum exhaust, connected to the first aperture 1.08 of the instant invention. Such attachment is accommodated via a tubular air transport vessel 1.14, such as but not limited to said flexible or fixed shaped piping. The forced air induction means 1.13 through aperture 108 thus directs chips and debris through the tubular shape transporter 1.02 allowing for the exiting of such debris through a second aperture 1.10 positioned generally opposite said first aperture 1.08. As can also be seen in FIG. 1, a second tubular air transport means 1.15 such as but not limited to flexible tubing is attached to said second aperture 1.10 and allows for the depositing of exiting debris into a containment vessel, such as but not limited to a disposable storage bin, garbage bag, etc. 1.16. A further hose may be connected to the storage bin or bag to direct floating dust outside. FIG. 2 is an illustration of a phantomed planer providing closer detail of the present invention attached thereto.

In FIG. 2, wing nut attachment means 2.06, or other similarly intended attachment article(s) are shown connecting the chip deflector hood 2.03 to a wood planer housing 2.04. FIG. 2 provides greater detail with respect to the first aperture of generally oval shape 2.08 located at a first end 2.07 of the tubular shaped chip transporter 2.05 and a second aperture 2.10 of greater circumference located at the generally opposite end of said tubular shaped transporter 2.05.

Figure 3:
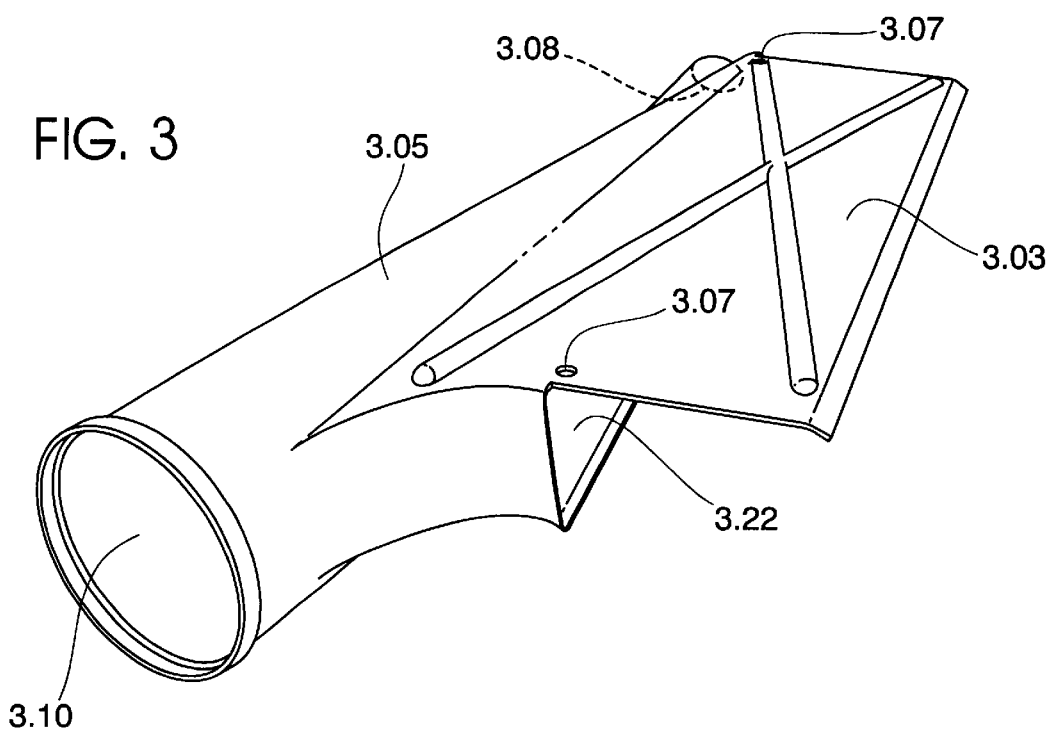
FIG. 3 illustrates a first side perspective view of the invention's preferred embodiment.
Figure 4:
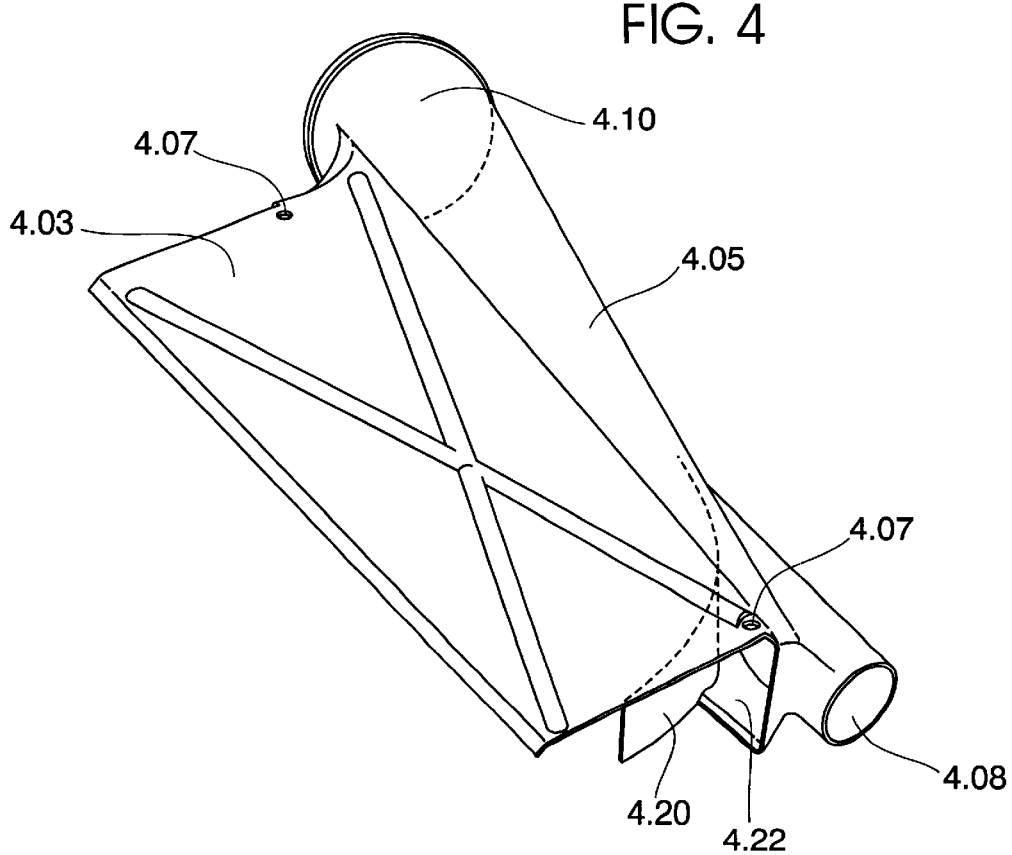
FIG. 4 illustrates a top view perspective of the invention's preferred embodiment. is a cross-sectional view of the instant invention further illustrating detailed interrelationships and positioning of the invention's internal components.

FIG. 3 illustrates a first side perspective view of the preferred embodiment wherein a third aperture of generally rectangular shape 3.22 is shown. The third aperture would be configured for each particular planer model. Said aperture 3.22 extends downward generally perpendicular to the invention's chip deflecting hood 3.03 and is positioned generally between first aperture 3.08 and second aperture 3.10. As can be readily envisioned, chip shaving and other debris exiting the planer attached to the instant invention enters the tubular shape transporter structure 3.05 via the third aperture 3.22 where such debris is met with the forced air stream disclosed and discussed in detail and association with FIG. 1. Turning now to FIG. 4.

FIG. 4 illustrates a top view perspective of the invention's preferred embodiment and further illustrates cross-sectional views of the instant invention to illustrate inter-relationships and positioning of the invention's internal components. FIG. 4 illustrates a chip flow baffle 4.20 extending from the underside of the invention's chip deflecting hood 4.03 (continuing internally via dash line) into the invention's tubular shaped chip transporter 4.05, said baffle 4.20 further directs debris exiting a wood planer to the tubular shaped transporter 4.05. Also shown in FIG. 4 are apertures 4.07 to allow for the insertion of a threaded connection means to affix the invention's chip deflector hood 4.03 to the external body of a wood planer.

FIG. 5 illustrates a second side perspective view of the invention's preferred embodiment further detailing internal structure of the invention's tubular shape transporter 5.05. Forced air introduced to the internal portion of the tubular shape transporter 5.05 (said air indicated by hyphenated arrows) flows within said tubular transporter in a direction from the invention's first aperture 5.08 towards, and exiting the invention's second aperture 5.10. Connected to the invention's said second aperture 5.10 is a tubular air transport means 5.15 further directs transported debris to a disposable/transportable containment vessel, such as a trash can or trash bag. Air enters into the internal construct of the tubular structure 5.05 via a first tubular air transport means 5.14 attached to both an air induction means, such as a shop vacuum and the invention's first aperture 5.08.

FIG. 6 illustrates a bottom side perspective view of the invention's preferred embodiment where the invention's chip flow baffle's 6.20 position can be readily observed and appreciated. Also illustrated in FIG. 6 is the invention's first and second apertures (6.08, 6.10 respectfully), the invention's tubular shaped chip transporter 6.05 and chip deflector hood 6.03.

Figure 7:
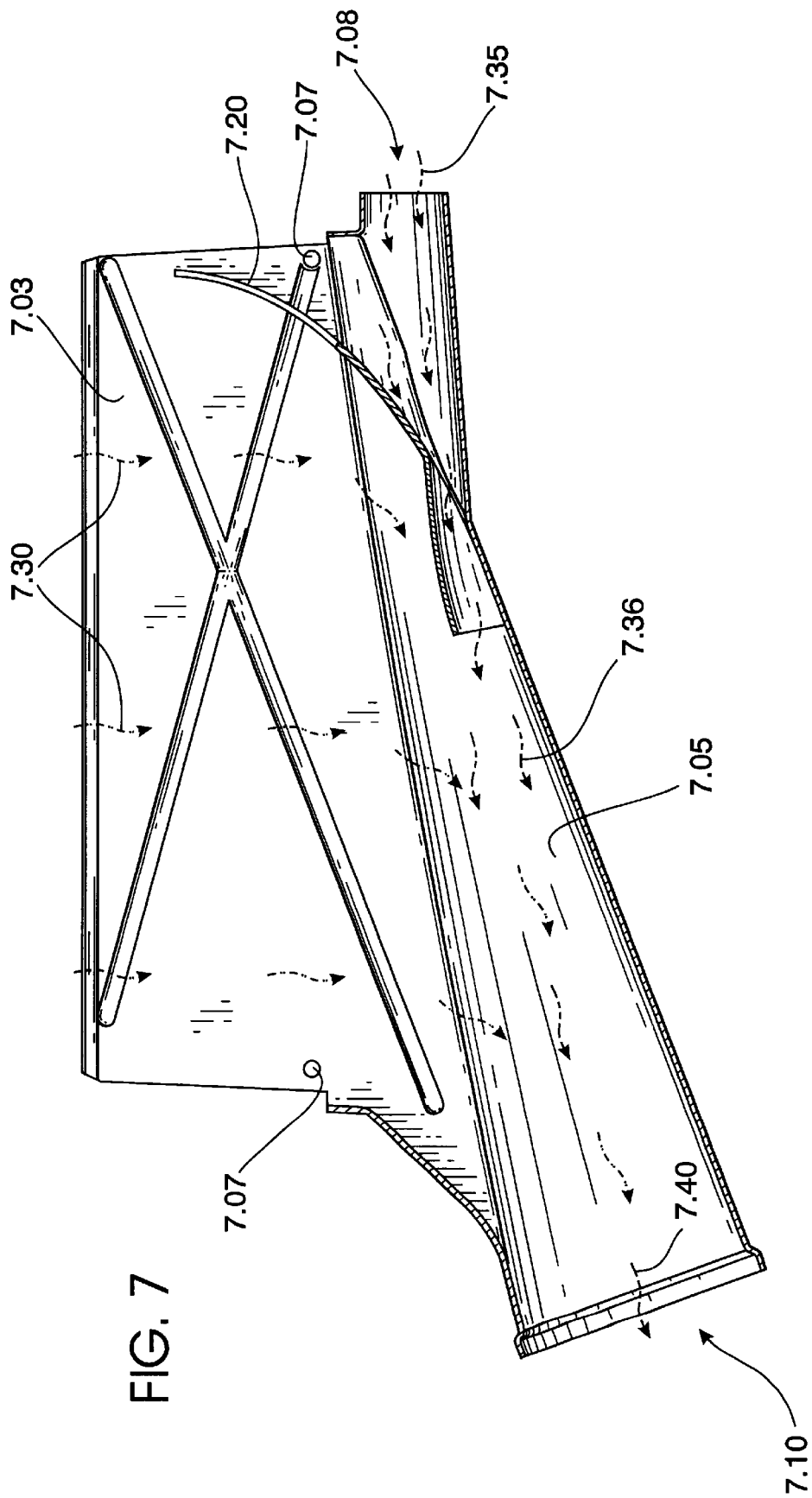
FIG. 7 is a top view of the invention's preferred embodiment primary components showing wood chip and air directional flows.

FIG. 7 illustrates a top view of the invention's preferred embodiment further illustrating wood chip and air direction flows. FIG. 7 depicts debris such as wood chips or shavings 7.30 entering under the chip deflector hood 7.03 of the instant invention. Such chips enter in a first direction towards the invention's tubular shape transporter 7.05, where the chips meet the laterally occurring movement of forced air indicated by arrows 7.35, and are combined with the forced air as indicated by arrows 7.36. The (initial) forward moving direction of debris 7.30 is influenced by the invention's chip flow baffle 7.20 to maximize introduction efficiency of such debris to the tubular shape transporter structure 7.05. Initial transport of debris to the tubular shape chip transporter 7.05 is precipitated typically via a motor cooling air flow generated from a rotating electric motor whose primary responsibility is to facilitate the turning of the cutting components of the wood planer. An additional influence upon introduction of such debris to the tubular structure 7.05 of the instant invention is a venturi effect generated by the introduction of forced air 7.35 introduced via a shop vacuum or other air projection means. Once within, or closely approaching the tubular shaped chip transporter 7.05 combined air and debris 7.36 are transported to the instant invention's second aperture of generally oval shape 7.10.

Figure 8:
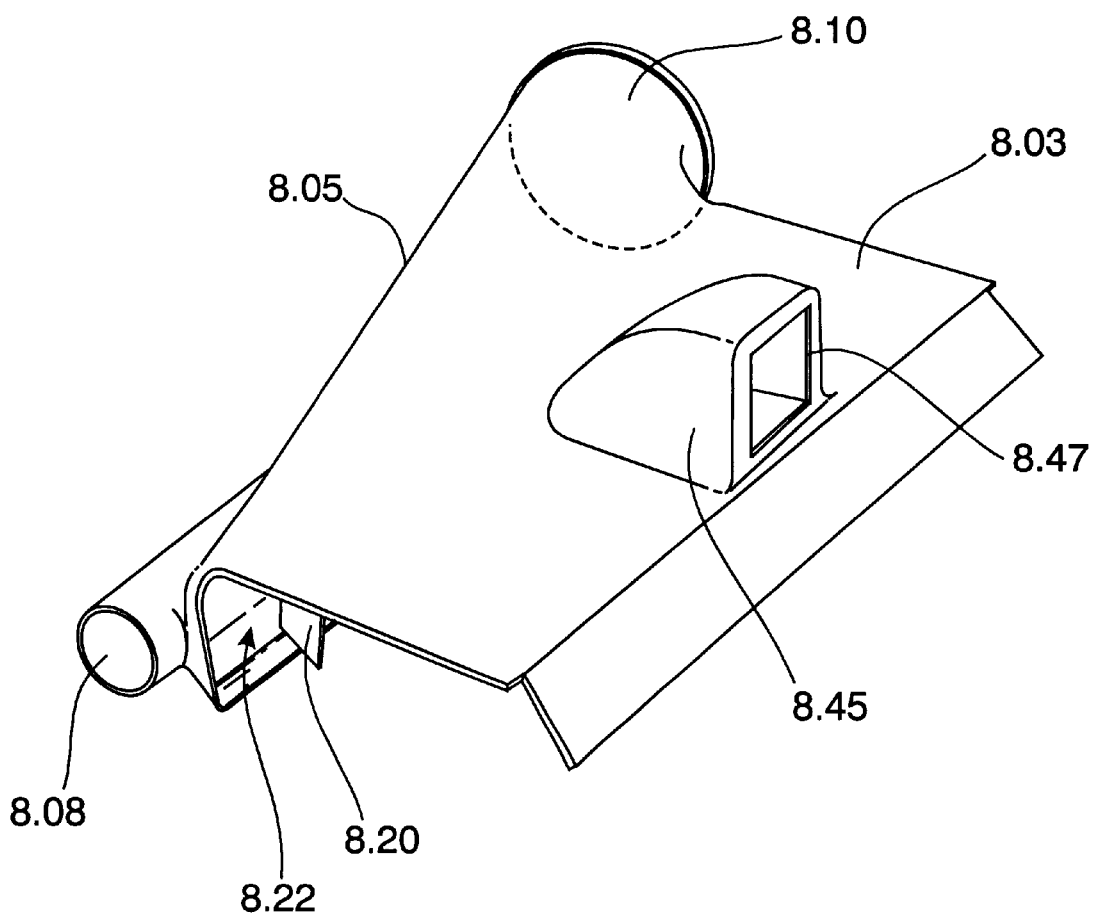
FIG. 8 illustrates an alternative embodiment of the instant invention where a wood planer has a different external air exhaust from the internal electric motor fan.

FIG. 8 illustrates an alternative embodiment of the instant invention where a wood planer illustrates a different external air exhaust from the internal electric fan motor. As shown in FIG. 8, an air flow conduit 8.47 is embodied within or attached to the chip deflector hood 8.03 of the instant invention. This hood more clearly indicates the expulsion of air from the cooling fan on the planer drive motor. All portable planers use this type of motor so they all exhaust the cooling air with or near the wood chips deflector. In practice the attachment of the instant invention's air chip deflector hood 8.03 will align the air conduit 8.47 with the airflow from the planer drive. Such alignment will facilitate, or better enable the flow of passive air through the conduit 8.47, into and under the chip deflector hood 8.03 where it will assist in the initial transport of wood shaving/debris to the tubular structure 8.05 of the instant invention.

While this invention has been described to illustrative embodiments, this description is not to be construed in a limiting sense. Various modifications and combinations of the illustrative embodiments as well as other embodiments will be apparent to those skilled in the art upon referencing this disclosure. It is therefore intended that this disclosure encompass any such modifications or embodiments.

What is claimed is:

1. An improved chip capturing device for a planer having a housing which includes a chip outlet, the improvement comprising:

a chip deflector hood attached to said housing and positioned adjacent to said chip outlet;

a tubular shaped chip transporter attached to said chip deflector hood;

a first aperture of generally oval shape within said chip transporter and positioned on a first end of said transporter;

a second aperture of generally oval shape within said chip transporter, said second aperture positioned generally opposite of said first aperture; and a third aperture extending generally perpendicular to said chip deflector hood, said third aperture positioned generally between said first and second apertures.

2. An improved chip capturing device of claim 1 further comprising a chip flow baffle connected to said chip deflector hood and extending into said tubular shaped chip transporter.

3. The improved chip capturing device of claim 1 further comprising an airflow conduit attached to said chip deflector hood.

4. An improved chip capturing device as set forth in claim 1 wherein said housing includes an interior chamber, a motor driven blade member rotatably mounted to said housing and extending transversely of said interior chamber.

5. An improved chip capturing device as set forth in claim 4 wherein said chip outlet extends transversely of said interior chamber adjacent an upstream side of said blade member.

6. The improved chip capturing device of claim 1 wherein said chip deflector hood, said tubular shaped chip transporter, said chip flow baffle and said first, second and third apertures are a molded composition.

7. The improved chip capturing device of claim 1 further comprising:
- a first tubular air transport vessel attached to said first aperture; and
- a second tubular air transport vessel attached to said second aperture.

8. The improved chip capturing device of claim 7 wherein said first vessel is attached to an exhaust from a vacuum.

9. An improved chip capturing device for a planer having a housing which includes an interior chamber, a motor driven blade member rotatably mounted to said housing and extending transversely of said interior chamber, a chip outlet extending transversely of said interior chamber adjacent an upstream side of said blade member, and a table positioned below said blade member, the improvement comprising:
- a chip deflector hood attached to said housing and positioned adjacent to said chip outlet;
- a tubular shaped chip transporter attached to said chip deflector hood;
- a first aperture of generally oval shape embodied within said chip transporter and positioned on a first end of said transporter;
- a second aperture of generally oval shape embodied within said chip transporters, said second aperture of greater circumference than said first aperture and positioned generally opposite of said first aperture;
- a third aperture of generally rectangular shape and extending generally perpendicular to said chip capture hoods, said third aperture positioned generally between said first and second apertures;
- a chip flow baffle connected to said chip deflector hood and extending into said tubular shaped chip transporter;
- a first tubular air transport vessel attached to said first aperture; and
- a second tubular air transport vessel attached to said second aperture.

10. The improved chip capturing device of claim 9 wherein said chip deflector hood, said tubular shaped chip transporter, said chip flow baffle and said first, second and third apertures are embodied as a molded composition.

11. The improved chip capturing device of claim 9 further comprising an airflow conduit attached to said chip deflector hood.

12. An improved chip capturing device for a planer having a housing which includes an interior chamber, a motor driven blade member rotatably mounted to said housing and extending transversely of said interior chamber, a chip outlet extending transversely of said interior chamber adjacent an upstream side of said blade member, and a table positioned below said blade member, the improvement comprising:
- a chip deflector hood attached to said housing and positioned adjacent to said chip outlet;
- an airflow conduit attached to said chip deflector hood;
- a tubular shaped chip transporter attached to said chip deflector hood;
- a first aperture of generally oval shape embodied within said chip transporter and positioned on a first end of said transporter;
- a second aperture of generally oval shape embodied within said chip transporters, said second aperture of greater circumference than said first aperture and positioned generally opposite of said first aperture;
- a third aperture of generally rectangular shape and extending generally perpendicular to said chip capture hoods, said third aperture positioned generally between said first and second apertures;
- a chip flow baffle connected to said chip deflector hood and extending into said tubular shaped chip transporter;
- a first tubular air transport vessel attached to said first aperture; and
- a second tubular air transport vessel attached to said second aperture.

13. The improved chip capturing device of claim 12 wherein said chip deflector, said airflow conduit, said tubular shaped chip transporter, said chip flow baffle, said airflow conduit and said first, second and third apertures are embodied as a molded composition.

* * * * *